A. C. S. CLARK.
HOSE COUPLING.
APPLICATION FILED OCT. 23, 1915.
1,233,644.
Patented July 17, 1917.
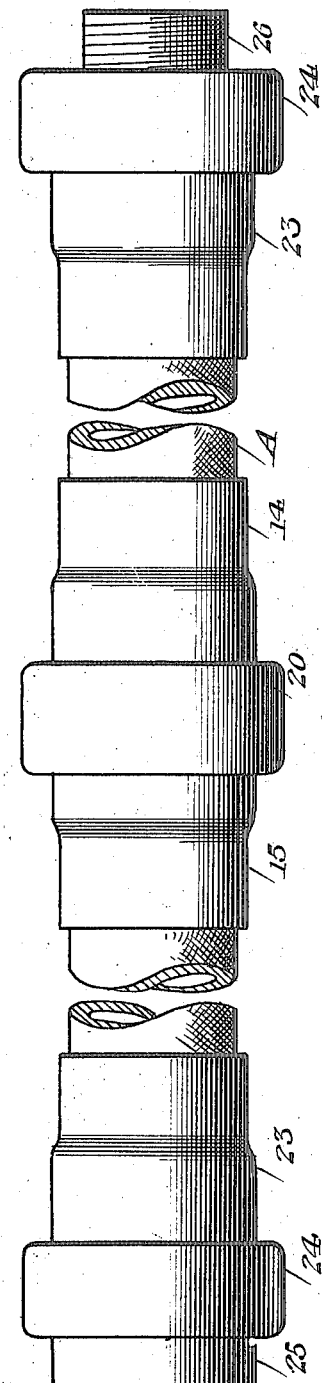
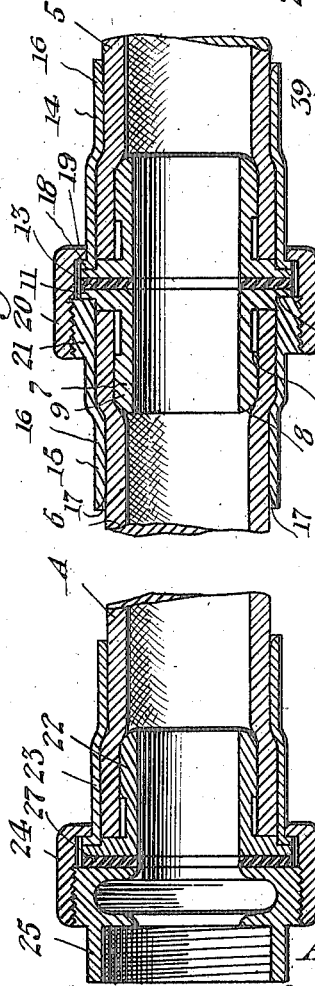
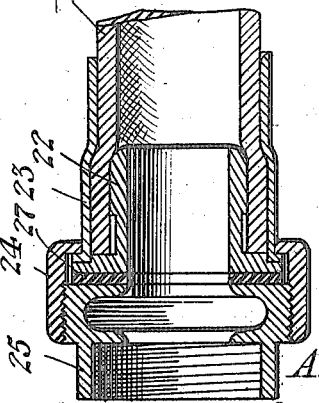
Inventor
A.C.S. Clark
By Victor J. Evans
Attorney

UNITED STATES PATENT OFFICE.

ALBERT C. S. CLARK, OF ST. PETERSBURG, FLORIDA, ASSIGNOR OF ONE-HALF TO WILLIAM MOSEDALE, OF ST. PETERSBURG, FLORIDA.

HOSE-COUPLING.

1,233,644. Specification of Letters Patent. Patented July 17, 1917.

Application filed October 23, 1915. Serial No. 57,535.

*To all whom it may concern:*

Be it known that I, ALBERT C. S. CLARK, a citizen of the United States, residing at St. Petersburg, in the county of Pinellas and State of Florida, have invented new and useful Improvements in Hose-Couplings, of which the following is a specification.

The invention relates to couplings, and more particularly to the class of non-leakable hose and splicing couplings.

The primary object of the invention is the provision of a coupling of this character wherein the same can be mounted upon and detached from a hose by hand, thereby eliminating the necessity of the use of tools for this purpose and when upon the hose will absolutely prevent leakage at the joints where the nozzle is connected thereto and also the connection at the hydrant or spigot as well as at a joint where the sections of a hose are spliced resultant from a breakage in the line thereof.

Another object of the invention is the provision of a coupling of such character that in event the hose bursts the same can be readily mended with despatch.

A further object of the invention is the provision of a coupling of this character which is extremely simple in construction, thoroughly reliable and efficient in its purpose, strong, durable, and inexpensive to manufacture.

With these and other objects in view, the invention consists in the construction, combination and arrangement of parts, as will be hereinafter fully described, illustrated in the accompanying drawings, and pointed out in the claim.

In the drawing;

Figure 1 is a side elevation of a hose showing the coupling constructed in accordance with the invention, applied.

Fig. 2 is a vertical longitudinal sectional view through the hose and coupling.

Fig. 3 is a fragmentary vertical longitudinal sectional view showing a slight modification of the invention.

Similar reference characters designate corresponding parts throughout the several views in the drawing.

Referring to the drawing in detail, A designates generally, a hose, which may be of any desirable length, and, in this instance, is formed of two sections 5 and 6 respectively which are connected together by the use of a coupling hereinafter fully described.

The coupling comprises a pair of similarly constructed inner nipples 7, each having a rounded external end edge 8 formed at the enlarged portion 9 which provides a shoulder 10 at a point inwardly of and removed from the rounded edge 8 and each nipple 7 is inserted or telescoped within one end of each section. Formed on the other end of each coupling 7 is an outturned annular flange 11 having a rabbet 12 circumferentially thereof in its inner face and between these flanges 11 of the pair of nipples is arranged a resilient washer 13. Upon the ends of the sections 5 and 6 of the said hose A and encircling the same are outer sleeve-like members 14 and 15 respectively, each having a contracted end portion 16 with a beveled or rounded internal end edge 17, while at the opposite end edge of the member 14 is formed an outturned annular flange 18 against which abuts the inturned annular flanged end 19 of an internally threaded collar or nut 20 which is adapted for detachable engagement with the externally threaded enlarged end portion 21 of the sleeve 15 so as to join the said sleeves with each other for uniting the sections 5 and 6 of the hose A.

The flange 18 on the sleeve 14 and the externally threaded enlarged portion 21 on the sleeve 15 are adapted to be seated in the rabbets 12 in the flanges 11 on the inner nipples 7 so that when the collar or nut 20 joins the sleeves 14 and 15 pressure is exerted upon the washer 13 for compressing the same between the flanges 11 on the nipples and thereby rendering an absolute fluid tight joint. The coupling hereinbefore described is employed for splicing a hose when the same bursts or is broken in its length.

At each free end of the hose A is a coupling comprising an inner nipple 22 which is identical in structure with each nipple 7, hereinbefore described, while surrounding the hose A without the same is an outer sleeve 23 which is similar to the sleeve 14 and concentrically disposed about the larger end of this sleeve 23 is the internally threaded collar or nut 24 in which is adapted to be detachably fitted the hydrant or spigot connection 25 or the nozzle connection 26, as shown, and between these connections is interposed the washer 27 which works against the flange on the inner nipple 22, thereby providing an absolute fluid tight joint at these points.

In Fig. 3 there is shown a slight modification of the invention, wherein the coupling comprises a nipple 28 formed with an externally threaded end 29 for the connection of a nozzle therewith, and telescoped upon this nipple is the end of the hose 20 which is surrounded by a sleeve 31 having a contracted end portion 32 and an externally threaded end portion 33, with which engages an internally threaded collar 34 formed with an inturned annular flange 35 engaging in a seat 36 formed in an annular external shoulder 37 on the nipple 28, while the sleeve 31 at its externally threaded end engages in a seat 38 formed in the said shoulder 37, the collar 33 being designed to lock the coupling and sleeve together, while the said coupling 28 at its nipple end is formed with an externally enlarged portion 39 which compresses the hose 30 between it and the contracted portion 32 of the sleeve 31, thereby forming a fluid-tight joint between the nipple and the said hose, and at the same time permitting the interchanging of the coupling as occasion may require.

From the foregoing, it is thought that the construction and manner of employing the hose coupling will be clearly understood, and therefore, a more extended description has been omitted.

What is claimed, is:—

A hose coupling comprising a pair of annular nipples having their adjacent ends formed with radially extending flanges to present a relatively broad surface to receive a gasket between them, the opposite ends of the nipples being formed with means to enlarge the pipe ends fitted thereover, and thimbles encircling the pipe ends and shaped to conform to the normal and enlarged condition of the pipe to bind the pipe ends upon the nipples, said thimbles having enlarged outturned ends bearing against shouldered portions formed on the radially extended flanges of the nipples immediately beyond the pipe ends, and means coöperating with the respective outturned ends of said thimbles to draw the thimbles together with the effect to lock the pipe ends upon the nipples and compress the nipples upon the gasket.

In testimony whereof I affix my signature in presence of two witnesses.

ALBERT C. S. CLARK.

Witnesses:
Wм. M. Davis,
Frank A. Barbur.

Copies of this patent may be obtained for five cents each, by addressing the "Commissioner of Patents, Washington, D. C."